United States Patent
Rudolph et al.

(10) Patent No.: US 6,923,633 B2
(45) Date of Patent: Aug. 2, 2005

(54) SINGLE-COMPONENT AND MULTI-COMPONENT INJECTION-MOLDING MACHINE

(76) Inventors: Michael Rudolph, Wittelsbacher Strasse 21, 95110 Selb (DE); Roland Schmidt, Vordorfermühle 26, 95700 Tröstau (DE); Christian Saunus, Krumme Strasse 12, 08223 Grünbach (DE)

( * ) Notice: Subject to any disclaimer, the term of this patent is extended or adjusted under 35 U.S.C. 154(b) by 199 days.

(21) Appl. No.: 10/624,916

(22) Filed: Jul. 21, 2003

(65) Prior Publication Data

US 2004/0052894 A1 Mar. 18, 2004

Related U.S. Application Data

(63) Continuation-in-part of application No. PCT/EP02/00482, filed on Jan. 18, 2002.

(51) Int. Cl.⁷ .............................................. B29C 45/16
(52) U.S. Cl. ................... 425/130; 264/328.11; 425/574; 425/576
(58) Field of Search ................................ 425/130, 574, 425/575, 576; 264/328.11

(56) References Cited

U.S. PATENT DOCUMENTS

| 6,042,364 | A | * | 3/2000 | Nishida | 425/574 |
| 6,783,346 | B2 | * | 8/2004 | Bodmer et al. | 425/576 |
| 2002/0101005 | A1 | * | 8/2002 | Bodmer et al. | 425/576 |
| 2004/0076701 | A1 | * | 4/2004 | Lai | 425/130 |

* cited by examiner

Primary Examiner—Tim Heitbrink
(74) Attorney, Agent, or Firm—Klaus J. Bach

(57) ABSTRACT

In a single-component or a multi-component injection molding machine with a nozzle-side clamping plate firmly connected to a machine bed and a closing-side clamping plate supported on the machine bed so as to be movable thereon relative to the nozzle-side clamping plate, and each clamping plate carries a mold half of an injection-molding tool, the mold half or a part of the mold half on the closing-side clamping plate is rotatable about an axis of rotation extending in closing direction and is axially movable along the axis of rotation. In the closing-side clamping plate, a motor is received and which a rotatable shaft extends through the motor and is rotatable by the motor for rotating the mold half connected to the closing side clamping plate.

11 Claims, 7 Drawing Sheets

SINGLE-COMPONENT AND MULTI-COMPONENT INJECTION-MOLDING MACHINE

This is a continuation-in-part application of international application PCT/EP02/00482 filed Jan. 18, 2002 and claiming the priority of German applications 101 02 692.7 filed Jan. 22, 2001 and 101 45 461 filed Sep. 14, 2001.

BACKGROUND OF THE INVENTION

The present invention relates to a single- or multi-component injection molding machine with a nozzle-side clamping plate firmly connected to a machine bed as well as a closing-side clamping plate which is movable relative to the nozzle-side clamping plate, wherein both clamping plates carry each a mold half of an injection-molding tool and wherein at the nozzle-side one or several injection units are provided for supplying one or more thermoplastics to the nozzles.

For a better understanding of the object on which the present invention is based, such an injection-molding machine is explained below on the basis of an example of a two-component injection-molding machine with reference to FIGS. 1 to 5.

FIG. 1 is a schematic representation of a two-component injection molding machine according to the state of the art. The injection-molding machine 1 comprises a stationary machine bed 2 with a support plate 3 firmly connected thereto. The functions of an injection-molding machine as described below can be realized with a machine, which does or does not include guide bars.

On the machine bed 2, a closing unit for an injection molding tool is disposed. Shown is a two-component tool, which operates according to the principle of an indexing turntable 7a.

When, below, an operating piston 5 is referred to, it is to be understood that a drive mechanism is meant, which comprises a bell crank and/or a closing cylinder.

The closing unit comprises a movable clamping plate 4, which is slidable on the machine bed 2 by the operating piston 5 in the direction of the arrow a. The clamping plate 4 is defined as so-called "closing-side clamping plate". On the movable closing-side clamping plate 4 a first ejector-side mold half 6 of an injection molding tool with a first mold nest (7a and 7b) is disposed. This mold nest consists of a rotatable indexing plate 7a and a mold insert 7b. Opposite the closing-side clamping plate 4, a nozzle-side clamping plate 8 is disposed which is firmly connected to the machine bed 2. By this clamping plate 8, the so-called nozzle-side is defined. On the nozzle-side clamping plate 8, the second mold half of the injection molding tool 9 is disposed which, again, includes a second mold nest (not shown), which is complementary to the first mold nest 7. At the backside of the nozzle-side clamping plate 8, two injection units 10, 11 are disposed.

Upon closing the two mold halves 6 and 9, the operating piston 5 biases the closing-side clamping plate 4 against the stationary nozzle-side clamping plate 8. In this way, the two mold halves 6 and 9 are engaged with each other. In the interior thereof cavities are formed by the first mold nest 7a, 7b and the second mold nest, which is complementary thereto. With the two-component injection molding machine shown in FIG. 1, an upper cavity 13 is formed which is in communication with the upper injection molding unit 10 and a lower cavity, which is in communication with the lower injection molding unit 11. With the two injection molding units 10, 11, two different and/or the same plasticized thermoplastics can be injected into the upper and the lower cavity 13, 12. The first thermoplastic may be for example a thermoplastic material, which is relatively hard after hardening and onto which, for example, a relatively soft sealing lip is injection molded using the second thermoplastic; or the first thermoplastic is transparent and the second thermoplastic is opaque.

During the manufacture of so-called two component injection molding parts with the injection molding machine shown in FIG. 1, it is desirable during mass production that a second thermoplastic, which is introduced by way of the upper injection-molding unit 10, is attached, for example, to a first thermoplastic which has been introduced into the lower cavity 12 by way of the lower injection molding unit 11.

For this purpose, different methods are known for bringing an unfinished injection molded body, which has been formed in the lower mold cavity 12 from the first thermoplastic, into the operating range of the upper injection molding unit 10 to provide there for the attachment, by injection-molding, of the second thermoplastic. To this end, it is known to utilize, at the ejection-side mold half, a rotating structure, which will be described in greater detail below, and which is mounted to the front side of the clamping plate 4. The two-component injection molding method will be described in detail further below.

FIG. 2 shows, different from FIG. 1, the section of an injection molding machine 1 with bars 14 in a view, which is detailed with respect to FIG. 1. Shown is a closing unit to be inserted into an injection-molding machine in a perspective exploded view. With the different kind of representation of FIG. 1 and FIG. 2, it is intended to be indicated that there are different types of machines in the injection molding field.

The movable closing side clamping plate 4 is guided at its four corners by guide bars 14. The guide bars 14 extend into each corner between the support plate 3 shown in FIG. 1 and the nozzle-side stationary clamping plate 8. The clamping plate 4 is movable along the bars 14 in the direction of the arrow a by an operating piston 5 (not shown in FIGS. 2 and 3). In addition, the clamping plate 4 has a central opening 15, through which linear motion transmission elements, which are connected to an ejection unit, (not shown in FIGS. 2 and 3) can act on a stud 16 or a rotatable shaft 25 (FIG. 4), which is disposed at the rear end of a closing side tool engagement plate 17 of the molding tool in front of the closing-side clamping plate 4. By way of the stud 16 or the rotatable shaft 25, the sliding movement of the ejection unit (not shown) can be transmitted to the ejector pins (see FIGS. 4 and 5, reference numeral 28) in order to eject finished injection-molded pieces out of the closing-side mold half 6. In FIG. 2 the closing-side mold half is in the form of a sandwich structure, which comprises the tool engagement plate 17, support webs 18 disposed thereon and a closing-side molding plate 19 disposed on the support webs.

The ejection pins are disposed between the closing-side tool engagement plate 17, the support webs 18 and the closing-side mold plate 19. The closing-side mold nest 7 shown in FIG. 1 consisting of a rotating indexing plate 7a and the mold insert 7a is integrated into the mold plate 19.

During movement of the closing unit into a closed position, the closing-side clamping plate 4, together with the tool engagement plate 17, the support webs 18 and the closing-side mold plate 19 disposed on the closing-side clamping plate 4 are pressed onto the nozzle-side mold half 9, which consists of a nozzle-side molding plate 20 and a nozzle-side tool engagement plate 21. In this way, the two molding plates 19, 20 are placed on top of each other along the separation plane W shown in FIG. 3 and define in their interior the injection-molding cavities.

In connection with two-component injection molding procedures, it is known in practice to remove an unfinished injection molded body formed in the first cavity from the first cavity upon retraction of the closing side clamping plate and place it—using a robotic arm—into the second cavity 13. Upon closing the clamping plate 4 again, the second thermoplastic material component is then injected into the second cavity 13 to be added to the unfinished injection molded body. At the same time, a new unfinished injection molding body of the first thermoplastic material can be formed in the first cavity 13 from which the unfinished injection molded body has been removed by the robotic arm. However, as a result of the transfer of the unfinished molded body by a robotic arm, the effective cycle times are relative long with this procedure and, furthermore, an expensive robotic mechanism is required.

It is also known from the state of the art to engage the closing-side mold half 6 not directly with the closing-side clamping plate 4, but rather to mount it on a so-called turntable 23 (FIG. 4). Upon movement of the clamping plate 4 onto the nozzle-side clamping plate 8, a first cavity is formed for example by the lower closing-side mold nest and the lower nozzle-side mold nest, into which the first thermoplastic material is injected. Upon opening of the closing-side clamping plate 4, the unfinished injection molded body remains in this case in the closing-side lower mold nest.

The turntable 23, which is generally operated by a toothed rod and a gear cooperating therewith or by a motor and a gear is rotated upon retraction of the clamping plate 4 together with the mold half 6 disposed on the turntable 23 by 180°. After the tool has again been closed, the previously lower (now upper) closing-side mold nest and the upper nozzle-side mold nest form a second cavity, in which the unfinished injection molded body is embedded. Now the second thermoplastic material is injected and is attached to the unfinished molded body. At the same time, the previously upper (now lower) closing-side mold nest and the lower nozzle-side mold nest form a first cavity into which first thermoplastic material is injected to form another unfinished molded body during the same time in which the first unfinished molded body is completed in the upper cavity.

When the closing-side clamping plate 4 is again retracted the completed injection molded body is removed from the upper cavity and the turntable 23 with the second injection molded unfinished body embedded in the lower mold nest is again turned by 180° so that the cycle starts anew.

Although the use of a turntable 23 as described above has the advantage that the effective cycle times are noticeably reduced when compared with the use of a robotic arm removal technique, a problem remains in that the turntable 23 has to be driven by an external drive mechanism (hydraulic piston linkage or a mechanism with a gear and a toothed rod or an electric motor). As a result, the arrangement is relatively large and heavy so that relatively long periods are required for a conversion upon disassembly or the exchange of a turntable 23.

Also, the opening stroke of the molding tool is substantially reduced because of the large installation depth of the rotating unit between the two clamping plates. This often requires the use of a larger and therefore less economical injection-molding machine as it would be necessary based on the size of the injection-molded body.

FIG. 4 is a cross-sectional view of such a known rotating unit. A closing-side clamping plate 4, which is movably supported on a machine bed is provided with a central opening 15. On the closing side clamping plate 4, a rotatable unit 22 is disposed. The rotatable unit 22 comprises a turntable 23, which is connected to the clamping plate 4 and a gear 24 mounted centrally on the turntable 23.

A tool support plate 17 is disposed on the rotatable unit 22. Support webs 18 are disposed on the support plate 17. In the mold plate 19 which is supported by the support webs, the lower as well as the upper cavities 12 and 13 are provided into which the ejector pins 28 extent from the backside thereof.

In this embodiment, the rotatable shaft 25 is axially movable relative to the gear 24 in the direction of the arrow a. This axial movement of the rotatable shaft 25 is achieved by a cylinder drive (not shown). The rotatable shaft 25 is provided along its length with a multi-groove profile, which transmits the angular positions of the gear 24 to the rotatable shaft 25. The drive of the gear 24 in the turntable 23 is always a direct drive. When the two mold halves are engaged with each other, the rotatable shaft 25 is moved axially out of the mold nest 7 and the rotatable indexing plate 7a is turned by 180°.

If, for certain applications, the maximum travel distance x (FIG. 1) is to be utilized the turntable 23 has to be removed from the arrangement as shown in FIGS. 4 and 5. Depending on the size and the dimensions of the toothed rod 26 and the hydraulic cylinder 27, this may require extensive conversion efforts. The expensive internal support in the rotatable plate makes it also susceptible to servicing. It is particularly noteworthy that, in turntable drives with external hydraulic connections, also leaking problems occur frequently.

It is the object of the present invention to overcome the disadvantages of the state of the art explained in connection with the description of FIGS. 4 and 5.

In accordance with the invention, this is solved by the measures of claim 1.

The dependent claims relate to preferred embodiments of the present invention.

The advantages and features of the present invention are apparent from the following description of embodiments in connection with the drawings.

DESCRIPTION OF PREFERRED EMBODIMENTS

Figure 6:
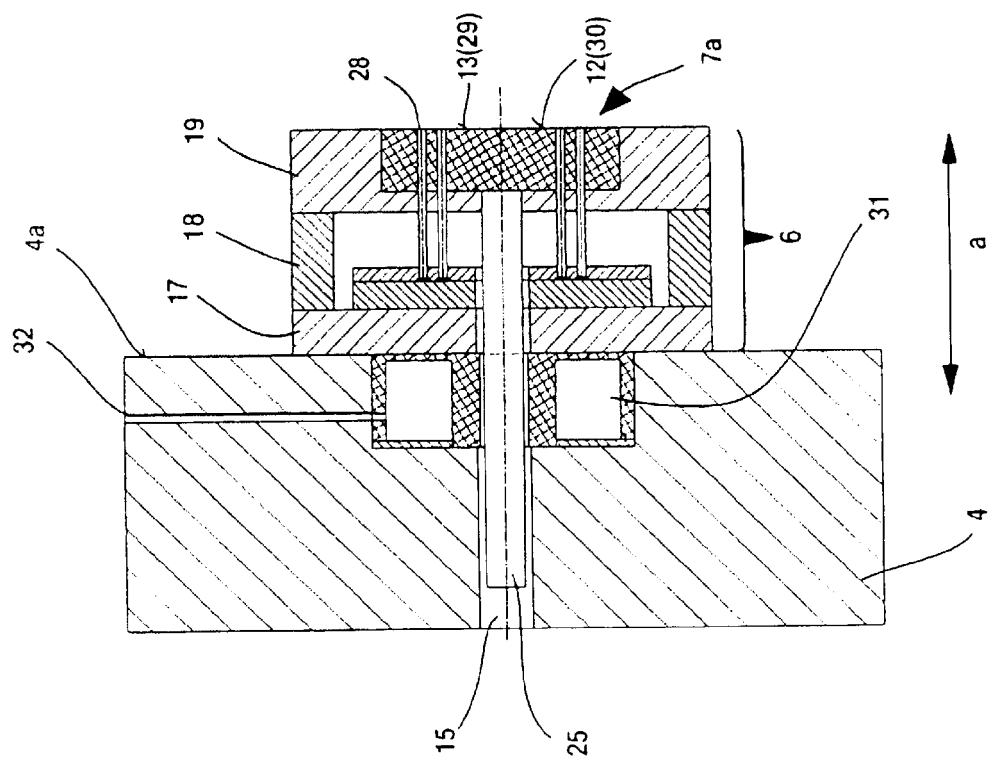
FIG. 6 shows a cross-sectional representation of a movable closing-side clamping plate including a molding tool half mounted thereon for use according to the invention in connection with a two component injection molding machine.
Figure 7:
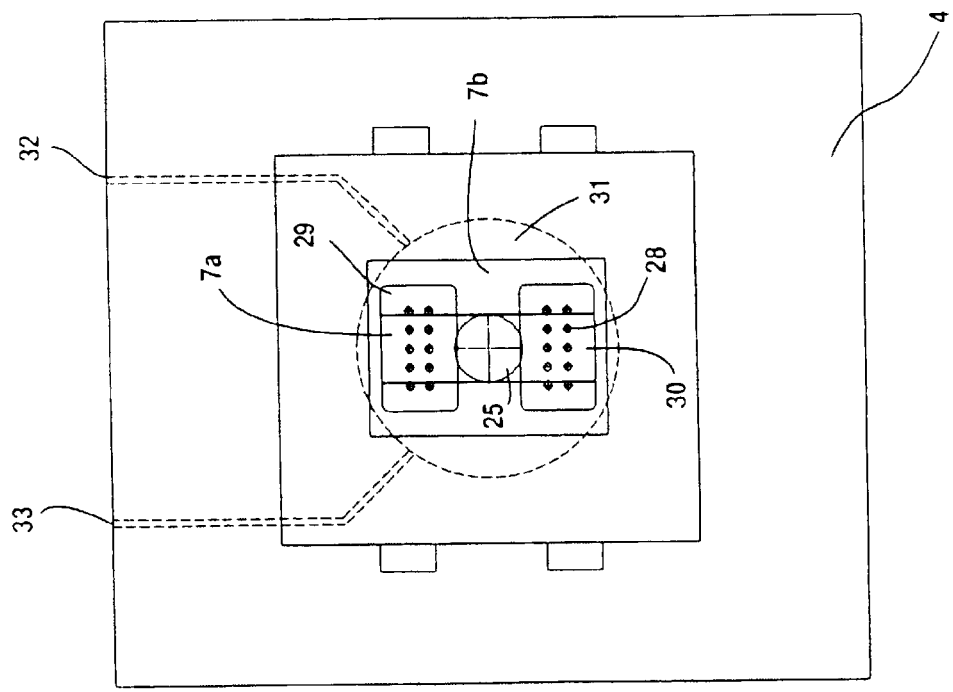
FIG. 7 is a front view of the molding tool half shown in FIG. 6 of an injection molding machine according to the invention.

The two-component injection molding machine according to the invention as shown in FIGS. 6 and 7 includes in the closing-side clamping plate 4 a center opening 15, in which the rotatable shaft 25 of drive motor 31 inserted into a recess of the clamping plate is supported. The motor 31 is disposed in the recess so as to be essentially flush with the outer surface 4a of the clamping plate 4.

Figure 9:
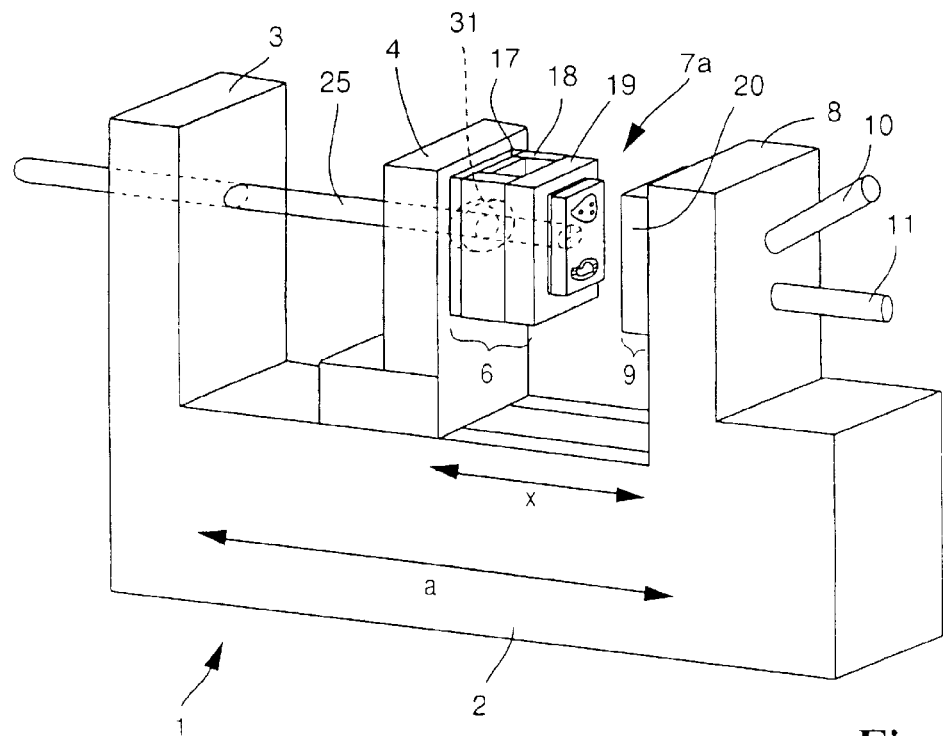
FIG. 9 shows an injection-molding machine according to the invention.
Figures 10, 11:
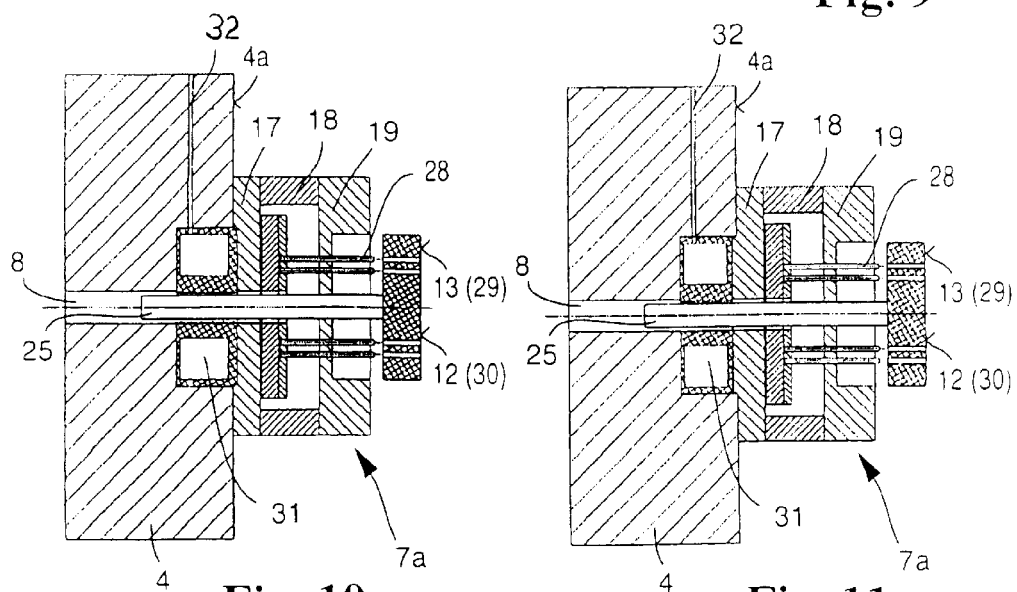
FIGS. 10 and 11 are cross-sectional views of a mold half mounted on a support plate and including a forwardly projecting or, respectively, recessed motor for centering with a stepped tool clamping plate.

In the embodiment of the invention as shown in FIGS. 9 and 10, the motor 31 projects slightly from the recess or is slightly recessed and the tool mounting plate is provided with a corresponding step for centering the injection-molding structure.

The motor 31 is preferably a hydraulic motor, which is driven by a liquid or gaseous drive medium that is admitted by way of an admission channel 32. A corresponding outlet channel 33 for the drive medium is shown in FIG. 7. In the view of FIG. 6, it is disposed behind the admission channel 32. A reversal of the flow direction from the outlet channel 33 to the supply channel 32 reverses the direction of rotation of the motor. In front of the clamping plate 4, there is the closing-side mold half which consists in the embodiment shown in FIGS. 6 and 7 of a tool support plate 17, support webs 18 and a closing-side mold plate 19 as well as an indexing turntable 7a. In this embodiment, the tool support plate 17 is firmly connected to the closing-side clamping plate 4. The support webs 18 and the closing-side mold plate 19 are firmly connected to the tool support plate 17. In the closing-side mold plate 19, an upper and a lower mold nest 29, 30 are integrated in an indexing turntable 7a according to FIG. 6. The indexing turntable 7a is firmly connected to the rotatable shaft 25.

This same arrangement is also shown in FIG. 9. In the center of the motor 31 shown in FIGS. 6 and 7 a rotatable shaft 25 which extends through the motor 31 is supported in a bearing hub. The motor 31 and the rotatable shaft 25 are so designed that the rotatable shaft 25 can be moved axially in any angular position in the direction of the arrow a of FIG. 6. Furthermore, because of the form-fitting connection of the hub and the shaft, any angular position can be transmitted to the rotatable shaft 25. The rotatable shaft rotates with the indexing turntable 7a. In this way, the indexing turntable 7a can be turned by 180°, whereby the cavity 12 shown in FIG. 6 at the bottom can be moved upwardly into the position of the upper cavity 13 as shown in FIG. 6.

Alternatively, a closing-side mold half may also be so designed that for example the tool support plate 17 is not firmly connected to the closing-side clamping plate 4, but the whole arrangement of the closing-side mold half 6 consisting of the tool support plate 17, the support webs 18, the closing-side mold plate 19 and the indexing turntable 7a is connected to the rotatable shaft 25. Depending on the design of the closing side mold half, the closing side mold half is turned completely with the rotatable shaft and/or is axially displaced or only parts therefore are rotated or moved axially.

Figure 8:
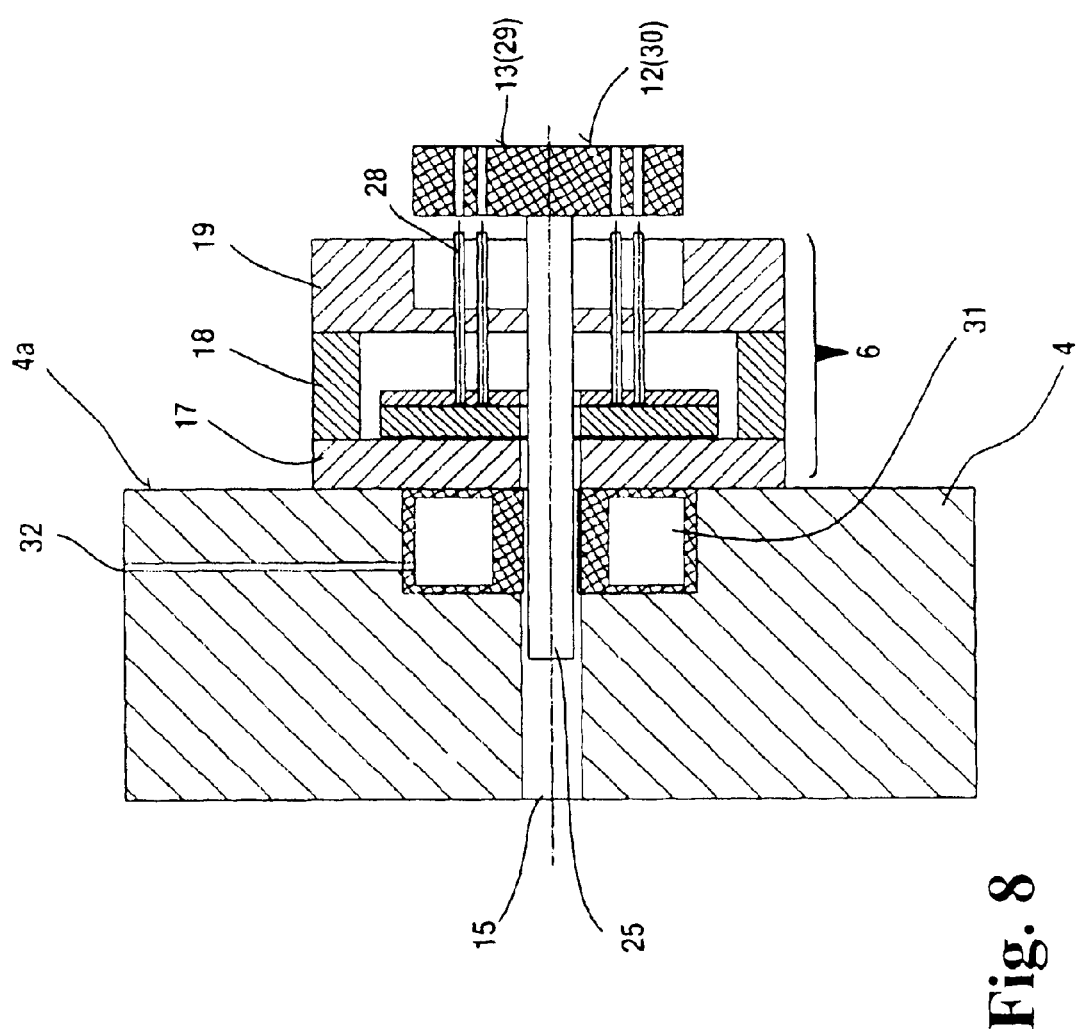
FIG. 8 shows a section corresponding essentially to FIG. 6 of a movable closing-side clamping plate including a mold tool half mounted thereon and an outwardly moved indexing turntable.

In FIGS. 10 and 11, a closing side-clamping plate 4 with a center opening 15 is shown, in which the rotatable shaft 25 is supported in a motor 31 which is integrated into the clamping plate 4. The motor 31 is disposed in a recess in the clamping plate 4 and, in contrast to the arrangement as shown in FIG. 6 and, respectively, FIG. 8, is not disposed flush with the respective engagement surface of the clamping plate 4. Rather, the motor is either recessed or it projects from the surface. In this way, centering during assembly of the molding tool is facilitated. The additional function of the motor of centering the molding tool reduces the set-up periods and facilitates servicing.

With the design according to the invention, a highly compact arrangement for the closing unit of a multi-component injection molding machine is obtained wherein the complete closing-side mold half 6 or parts thereof and the machine-side mold half 6 are rotatable relative to each other. At the same time, the open space (travel distance x) between the closing-side and the nozzle-side clamping plates is not reduced by the installation of an additional rotating unit as it is the case in the state of the art arrangements described in connection with FIGS. 4 and 5 because of the turntable 23 used in that case.

Since, in the injection-molding machine according to the invention, the motor 31 is firmly integrated into the closing-side clamping plate 4, the additional advantage is obtained that a permanently integrated rotating function for molding tools to be mounted to the closing-side clamping plate is provided. Whereas, in a prior art injection molding machine of a design as described in connection with FIGS. 4 and 5, part of the engagement pressure must be accommodated by the housing of the gear 24 when the tool is closed, with the solution according to the invention, that is, with the integration of the motor 31 into the clamping plate 4, all pressure forces, which are effective when the tool is closed are accommodated by components which are specifically designed for that purpose. This has the additional advantage that motors of compact design can be integrated into the closing-side clamping plate 4.

FIG. 8 shows an arrangement corresponding to that of FIG. 6. As shown, the rotating shaft 25 is displaced in axial direction forwardly (toward the machine side of the injection-molding machine), whereby the indexing turntable 7a can be rotated. By retracting the rotatable shaft 25 in axial direction the rotated turntable 7a is again returned into the closing-side mold plate 19. The previously lower part of the mold nest 30 is then moved to the top so that a second thermoplastic material can be injected and attached to the unfinished injection molded body contained therein.

With the arrangement according to the invention a novel tool- and injection molding machine concept of a very compact design for the closing unit of a single- or multi-component injection molding machine with relatively rotatable mold halves and/or molding elements has been created. The same principle can be used also for molding tools, which include more than two mold nests for more than two different thermoplastics.

It is of course also possible to mount molding tools, which do not need to be rotated, on the same clamping plate 4 without removal of the motor 31, which is firmly integrated into the closing-side clamping plate 4, that is, the injection-molding machine according to the invention can also be operated without utilizing the rotating function of the motor.

Figure 1:
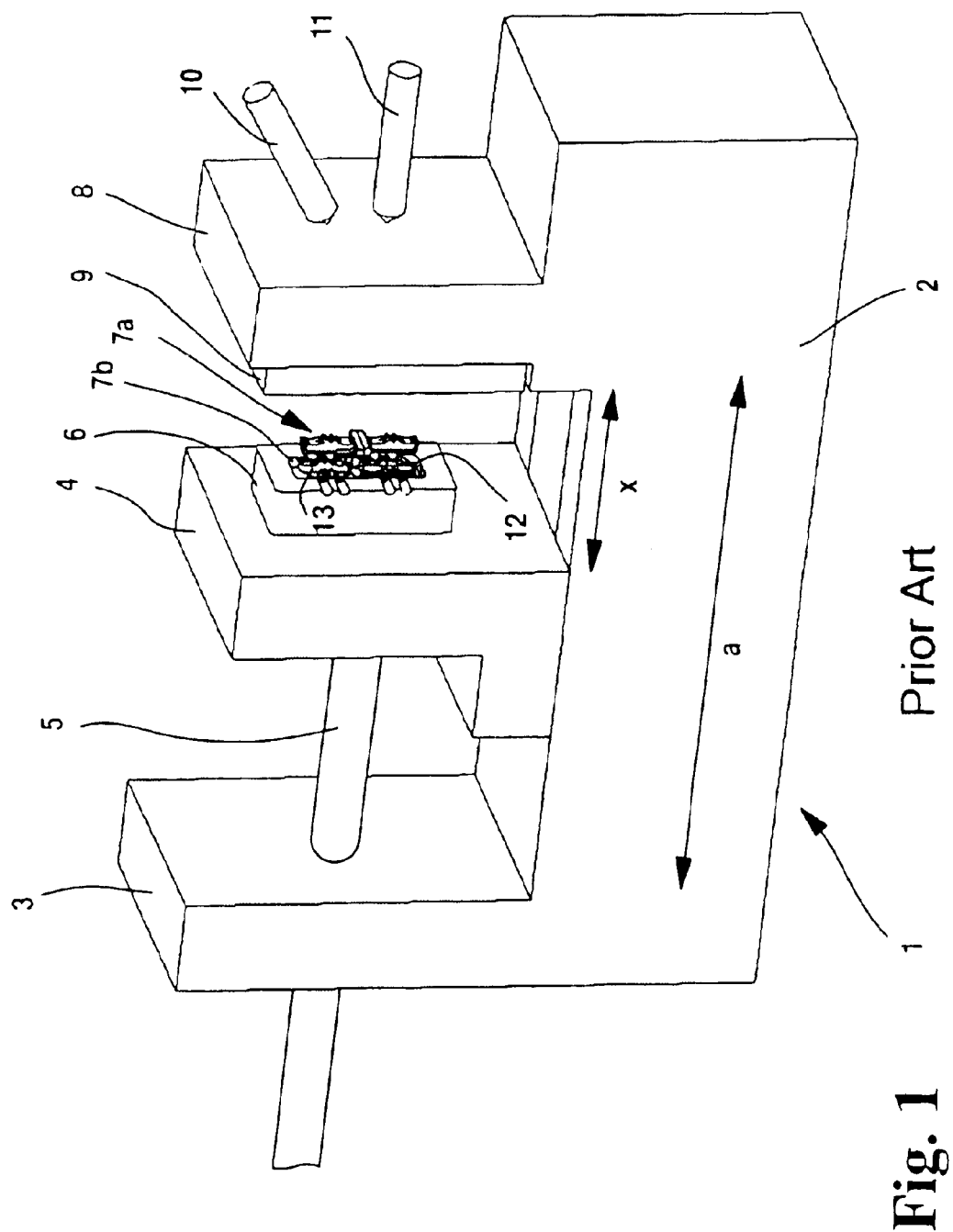
FIG. 1 shows schematically the design of a known injection-molding machine in a perspective view.
Figure 2:
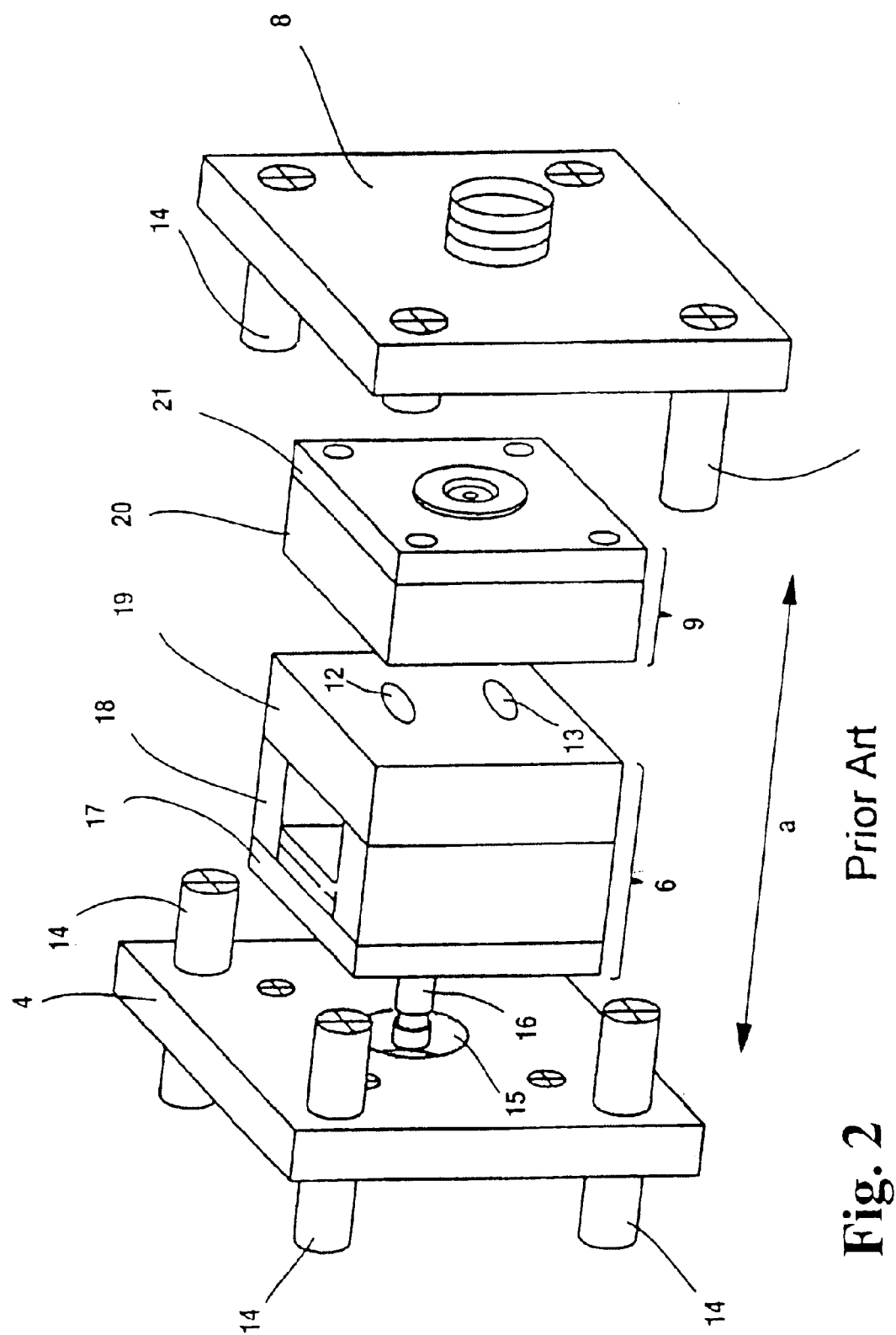
FIG. 2 is a schematic exploded view of an opened molding tool as it is used in an injection-molding machine as shown in FIG. 1.
Figure 3:
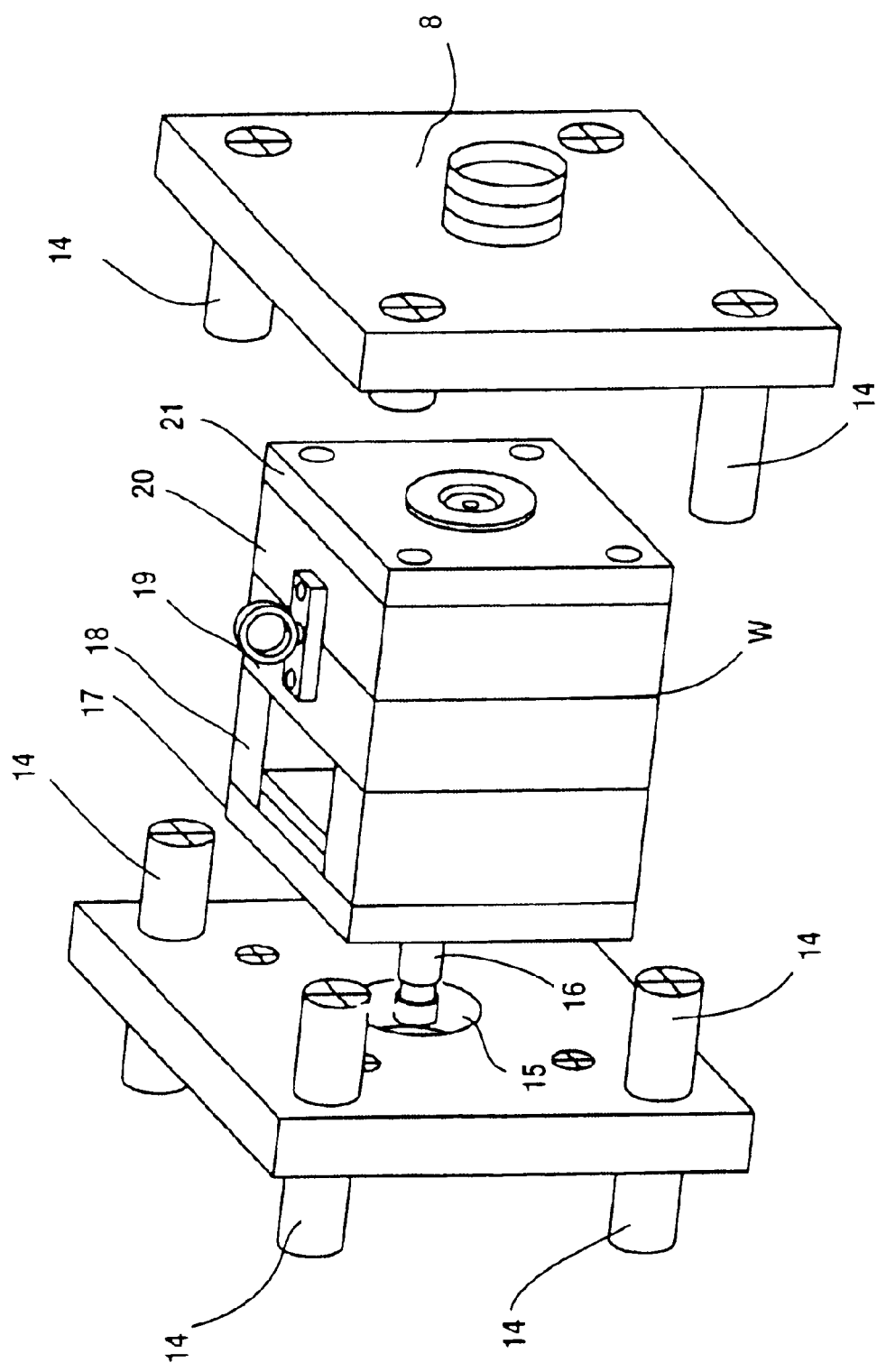
FIG. 3 is a schematic exploded view of a closed molding tool.
Figure 4:
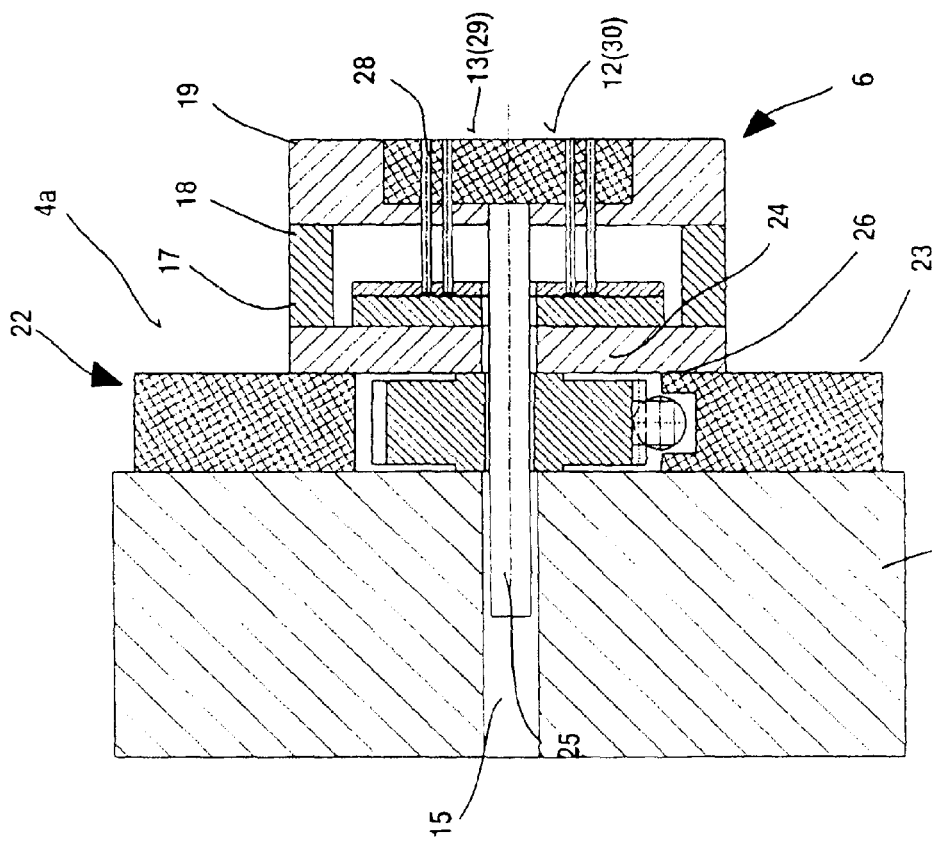
FIG. 4 is a cross-sectional view of a known closing-side clamping plate including a molding tool half for use in a two-component injection molding machine mounted onto an the support plate.
Figure 5:
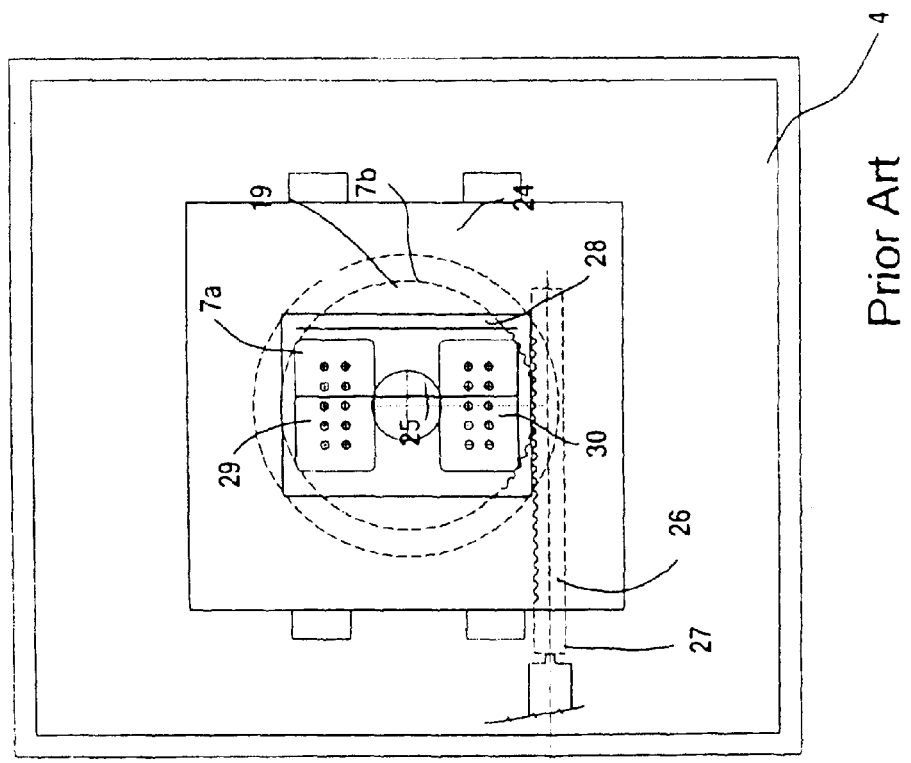
FIG. 5 is a front view of the molding tool half of FIG. 4.

Furthermore, the release of hydraulic oil at external hydraulic connections upon exchanging the rotating drive is eliminated. Whereas in a known injection-molding machine of a design as described in connection with FIGS. 4 and 5, with a closed tool, a part and/or all of the hydraulic pressure must be accommodated by the hydraulic motor housing, in the arrangement according to the invention wherein the motor 31 is integrated into the clamping plate 4 all pressure forces are accommodated by the clamping plate 4 and the tool mounting plate 17 when the tool is closed. In contrast to the state of the art, wherein, with the arrangement as shown in FIG. 4, the motor housing must be dimensioned sufficiently large to be able to accommodate the high pressure forces present in the injection-molding machine, with the integration of the motor 31 into the closing-side clamping plate 4, a motor 31 of substantially smaller, compact design can be provided since it is protected from exposure to high closing pressures by the clamping plate 4.

Instead of hydraulic motors, electric motors can be utilized. However, the use of a hydraulic motor with a hydraulic drive medium has the advantage that this medium can also be used as coolant for the clamping plate 4.

On the other hand, with the use of an electric motor, the rotatable mold half can be rotated in either direction and without any mechanical stops to any angular position by freely programmable movement control performance graphs.

This electric motor drive concept offers further the possibility to employ molding tools, which must not be contacted by hydraulic oil. There is no danger of oil contamination of the injection cavities. The use of an electric motor also results in substantially faster machine cycles since an electric motor reacts substantially faster than a hydraulic motor. As a result, the production cycle speed is increased. Furthermore, the operating expenses of electric motors are lower.

What is claimed is:

1. A single-component or multi-component injection molding machine (1) comprising: a machine bed (2), a nozzle-side clamping plate (8) with thermoplastic injection nozzles firmly connected to said machine bed (2), a closing-side clamping plate (4) supported on said machine bed (2) so as to be movable relative to the nozzle-side clamping plate (8), said clamping plates (4, 8) each carrying a mold half (19, 20) and forming an injection-molding tool with mold cavities and at least one injection unit (10, 11) provided at the nozzle-side clamping plate (8) for supplying one or more thermoplastics to said injection nozzles, said mold half (19) on the closing-side clamping plate (4) being rotatable about an axis extending in the closing direction and also movable longitudinally along the axis of rotation of said molding plate (7a), a motor (31) received in the closing-side clamping plate (4) and a rotatable shaft (25) extending through the motor (31) said motor rotating the rotatable shaft (25) for the rotation of the mold half (19) disposed adjacent the closing-side clamping plate (4), said rotatable shaft (25) being supported in the motor (31) so as to be movable relative to said motor (31) in an axial direction (a) together with said mold half (6).

2. Injection-molding machine according to claim 1, wherein said rotatable shaft (25) is connected to an indexing turntable (7a) which forms part of, and is disposed in, the closing-side mold half (19) and which includes the mold cavities, said indexing turntable being rotatable and axially movable together with the rotatable shaft (25) relative to the closing side mold half.

3. Injection-molding machine according to claim 1, wherein the motor (31) is a hydraulic motor with a supply channel (32) and an outlet channel (33) for a fluid drive medium in the closing side clamping plate (4).

4. Injection-molding machine according to claim 1, wherein the motor (31) is so integrated into the closing-side clamping plate (4) that it is disposed flush with the outer surface (4a) of the closing-side clamping plate (4).

5. Injection-molding machine according to claim 1, wherein the motor (31) is so integrated into the closing side clamping plate (4) that, with a hydraulic motor, the pressure generated in the interior of the motor for providing the torque is accommodated by way of the closing-side clamping plate (4) and a sandwich arrangement of the closing side mold half (6).

6. Injection-molding machine according to claim 1, wherein said motor (31) projects from the engagement surface (4a) of the closing side clamping plate (4) for fixing a tool support plate (17) provided with a recess receiving the projecting end of the motor (31).

7. Injection-molding machine according to claim 1, wherein said motor (31) is an electric motor.

8. Injection-molding machine according to claim 1, wherein said motor (31) can be stopped in any angular position and the rotatable shaft (25) is axially movable to any desired axial position.

9. Injection-molding machine according to claim 1, wherein said motor (31) is so integrated into the closing-side clamping plate (4) that, with respect to the mounting surface of the closing-side mold half, is recessed for the centering of the closing side mold half.

10. Injection molding machine according to claim 1, wherein said motor (31) is disposed in a recess in the clamping plate, said motor (31) including a hub bearing for receiving a rotatable shaft (25) which extends through the motor (31), said motor rotating the rotatable shaft (25) in such a way that a mold half (6) or parts thereof connected to the closing side clamping plate (4) can be rotated and said rotating shaft (25) being movable in the motor (31) in axial direction (a) together with the mold half (6) or parts thereof.

11. Injection molding machine according to claim 1, wherein the motor (31) is a hydraulic motor.

\* \* \* \* \*